United States Patent [19]

Lenard

[11] 4,136,585
[45] Jan. 30, 1979

[54] SHARPENING MACHINE FOR SAWS

[75] Inventor: Peter Lenard, Biberach an der Riss, Fed. Rep. of Germany

[73] Assignee: Vollmer Werke Maschinenfabrick GmbH, Biberach, Fed. Rep. of Germany

[21] Appl. No.: 782,450

[22] Filed: Mar. 29, 1977

[30] Foreign Application Priority Data

Apr. 2, 1976 [DE] Fed. Rep. of Germany ....... 2614419

[51] Int. Cl.$^2$ ............................................. B23D 63/14
[52] U.S. Cl. ........................................................ 76/40
[58] Field of Search ................................ 76/40, 43, 37

[56] References Cited

U.S. PATENT DOCUMENTS 3,960,037  6/1976  Stier ......................................... 76/43

FOREIGN PATENT DOCUMENTS 1424927  2/1976  United Kingdom ......................... 76/40

Primary Examiner—Harold D. Whitehead
Assistant Examiner—Roscoe V. Parker, Jr.
Attorney, Agent, or Firm—Burns, Doane, Swecker & Mathis

[57] ABSTRACT

A sharpening machine for sharpening toothed saws comprises a support for a saw blade supporting the blade for rotary adjustment in a direction of feed. A carrier is mounted for rotation about a tilting axis. A lifting carriage is mounted on the carrier. A spindle head is mounted on the lifting carriage. A grinding wheel is rotatably mounted in the spindle head. The lifting carriage is mounted to the carrier for swiveling movement about a swiveling axis which intersects the axis of the spindle head. The lifting carriage is rotatable at least 180° from a standard position in which the spindle head axis is located in or parallel to the plane of the saw blade. The tilting axis of the carrier is oriented perpendicular relative to a plane containing both the spindle head axis and the swiveling axis. The carrier is rotatable in a range of at least 90° about the tilting axis. The tilting range lies on both sides of a neutral position in which the spindle head axis is disposed parallel to the direction of feed.

3 Claims, 5 Drawing Figures

SHARPENING MACHINE FOR SAWS

BACKGROUND AND OBJECTS

The invention relates to a sharpening machine for saws. Machines of this sort generally include a support for a saw blade and a spindle head which carries a grinding wheel spindle for a dish-shaped grinding wheel. The spindle head is disposed on a lifting carriage. The lifting carriage is connected to a carrier and is rotatable about a swiveling axis which intersect the axis of the grinding wheel spindle. The spindle head may be placed in a standard position in which the axis of the grinding wheel spindle lies in the plane of the saw blade or parellel thereto, and from there swiveled around the swiveling axis. The carrier can be tilted by at least 90° around a standard tilting axis which is normal in relation to the common plane of the axis of the grinding wheel spindle and the swiveling axis.

In the case of known sharpening machines of saws of this type, the swiveling range of the lifting carriage, starting out from the standard position in which the axis of the grinding wheel spindle lies in the plane of the saw blade, is between 30° to 45° in either direction. Swiveling like this is provided exclusively for the purpose of grinding surfaces on the teeth of the saw blade which are slanting toward the one or the other side and especially surfaces of the tooth face alternatingly slanting to the one or the other side.

The tilting range of the carrier lies between a position in which the axis of the grinding wheel spindle has been disposed in parallel to the feed direction of the saw blade and a position in which the axis of the grinding wheel spindle is disposed normally in relation to the feed direction of the saw blade. By shifting the carrier within the tilting area, it will be possible to grind the surfaces of tooth faces having any arbitrary rake angle and the surfaces of the teeth having any arbitrary setting angle. By rake angle is meant the angle between the straight line lying in the plane of the saw blade and at the same time in the surface of the tooth face, and a perpendicular line in relation to the feed direction or the direction of the operational movement of the saw blade. By a setting angle is meant the angle between the feed direction or the direction of operational movement of the saw blade and a straight line tangential to the surface of the rear of the teeth in the point of the tooth, lying in the plane of the saw blade. It is customary to arrange the plate-shaped grinding wheel for the grinding of the surfaces of the tooth face in such a way, that the operating surface of the grinding wheel studded generally with diamonds, faces the spindle of the grinding wheel. For grinding the rear surfaces of the teeth, said grind wheel on the contrary is customarily disposed in such a way, that its operating surface faces away from the spindle of the grinding wheel. In both cases, the spindle head is preferably disposed in such a way, that the swiveling axis of the lifting carriage extends through the operating surface of the grinding wheel and intersects the axis of the spindle of the grinding wheel at a right angle. The known tilting range of the carrier described, also suffices for the grinding of such saw blades, the rake angle of which is negative, as frequently happens for metal processing. The grinding of both positive as well as of negative rake angles is made possible in the case of known machines of the described variety by the fact, that the saw blade is mounted differently. For example, the blade of a circular saw with a positive rake angle is mounted in such a way, that the forward rotational direction of the saw blade is opposite to the clockwise direction. A saw blade of a circular saw with a negative rake angle on the contrary is mounted in such a way, that the forward rotational direction of the saw blade agrees with the clockwise direction. In the first mentioned case, the operating surface of the grinding wheel faces the spindle of said grinding wheel and in the second case, the operating surface of the grinding wheel faces away from the spindle of said grinding wheel.

The requirement of mounting saw blades with a negative rake angle differently from saw blades with a positive rake angle has not been felt to be disturbing hitherto. If however, in the case of a saw blade with a negative rake angle, not only the surfaces of the tooth face but also the rear surfaces of the tooth are to be ground, it is necessary in the case of known sharpening machines to reverse the saw blade after the grinding of the surfaces of the tooth face which may be very cumbersome in the case of large and heavy saw blades.

The invention is based on the object of designing a sharpening machine for saws of the initially described type in such a way, that all surfaces of the tooth face and the rear of the tooth and possibly additionally even the chamfers may be ground in every case with a single clamping of the saw blade no matter whether the rake angle is positive or negative.

BRIEF SUMMARY

According to the invention, this object has been solved by the fact, that the swiveling range of the lifting carriage starting out from the normal position, amounts to at least 180°, and the tilting range of the carrier lies on both sides of a neutral position in which the axis of the spindle of the grinding wheel is disposed in parallel to the feed direction of the saw blade. The possibility of swiveling the lifting carriage not only exists, according to the invention, in a considerably larger area of swivel than in the case of the known sharpening machines for saws, but above all in a new connection with the possibility of tilting the carrier and with the position of the tilting area. With a machine according to the invention, all grinding operations can be accomplished on a saw blade with a single clamping even if, for example, cutter teeth and trimming teeth having variable surfaces and bevels alternate on a saw blade. The conversion of grinding of surfaces of tooth faces with a positive rake angle to the grinding of surfaces of tooth faces with a negative rake angle is accomplished simply by the fact, that (1) the carrier is tilted from the one side of its neutral position to the other side by the amount of the positive rake angle, augmented by the absolute amount of the negative rake angle, (2) the lifting carriage is swiveled by 180°, and (3) the grinding wheel, the operating surface of which originally faced the spindle of the grinding wheel, is turned, so that the operating surface faces away from the spindle of the grinding wheel.

If, additionally, the possibility is to exist of grinding, in a manner known per se, slanting surfaces of the tooth face and other slanting surfaces, then it will be necessary that the swiveling range of the lifting carriage, starting out from the normal position, amounts to the one side to at least 30°, preferably 45°, and to the other side to at least 210°, preferably 225°.

If beyond that, there is to be a possibility of grinding slopes of 0° upwards as well as positive and negative rake angles up to 30°, then according to a preferred embodiment of the invention, the tilting range of the carrier, starting out from its neutral position, to the one side amounts to at least 90° and to the other side to at least 30°.

THE DRAWING

A preferred embodiment of the invention will be described in the following paragraphs in connection with schematic drawings in which.

DETAILED DESCRIPTION

Figure 1:
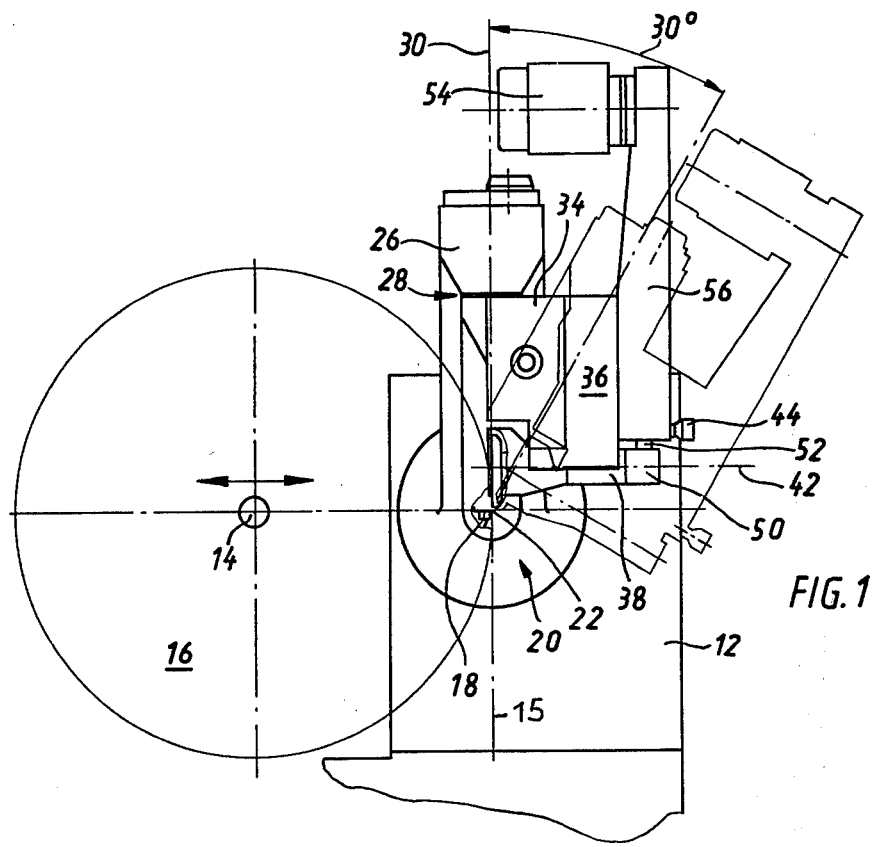
FIG. 1 shows a side view of the upper part of a sharpening machine for saws, the essential movable parts of which are shown in a position for grinding the surfaces of the backs of the teeth with a setting angle of 0° in solid lines and in a position for grinding the surfaces of the backs of the teeth at a setting angle of 30° indicated with thin lines.

The sharpening machine for saws has a machine frame 12 only partially shown, on which a support 14 for a saw blade 16 has been provided. The support 14 in this case is indicated only in the shape of a bearing pin, on which the saw blade 16 of a circular saw is mounted rotatably. This bearing pin is adjustable in both directions of the double arrow in FIGS. 1, 2 and 3, in order that saw blades 16 of various diameters may be processed. The support 14 may be constructed in any arbitrary manner such as according to the German OS No. 2 412 938. A feed arrangement of any kind, not shown, which for example may be in accordance with the German OS No. 2 412 939, cooperates with the support 14, and has for its task the rotary feeding of the saw blade 16 step by step by one or several tooth spacings in such a way, that always one tooth 18 reaches an operating position shown in FIGS. 1, 2 and 3. The direction of feed 15, then, may be considered tangential to the blade periphery at the junction of the blade and the grinding wheel.

Furthermore, a tilting bearing 20 has been provided on the machine frame 12, the geometrical axis of which will be called tilting axis 22 in the following paragraphs. In the tilting bearing 20, a bearing pin 24 has been mounted which is attached to an essentially L-shaped carrier 26 or is made of one piece therewith. The carrier 26 may be swung around the tilting axis 22 within a tilting range of 120° out of the position shown in FIG. 1 with solid lines into the position drawn in FIG. 3 with thin lines and may be clamped in any of these two positions as well as in any selected, intermediate positions on the machine frame 12. For this purpose a mechanical clamping arrangement formed such as screws, or pneumatic or hydraulic clamping arrangement of a known kind may be provided in the area of the bearing pin 24.

The carrier 26 carries a swivel bearing 28, the geometrical axis of which, designated as the swiveling axis 30 in the following paragraphs, lies in the plane of the saw blade 16 and intersects at right angles the tilting axis 22 disposed perpendicularly in relation to this plane. The stump of a shaft 32 is mounted in the swivel bearing 28, which shaft is attached to a guide 34 of the carriage or which is developed in one piece therewith.

On the guide 34 of the carrier, a lifting carriage 36 is shiftably guided for movement in the direction of the swiveling axis 30. In order to shift the lifting carriage 36, a drive, not shown, has been provided in a known manner, such as a hydraulic piston-cylinder unit, the cylinder of which may be inserted into the lifting carriage 36 or into the carriage guide 34 or even into the carrier 26.

The lifting carriage 36 bears a spindle head 38, in which a spindle 40 of a grinding wheel 46 is mounted rotatably. The geometrical axis, also the rotating axis, of the spindle 40 of the grinding wheel (which in the following will be designated as the axis 42 of the spindle of the grinding wheel), intersects the swiveling axis 30 at a right angle. The spindle head 38 with the spindle 40 of the grinding wheel may be adjusted on the lifting carriage 36 along the axis 42 of the spindle of the grinding wheel. In order to shift the spindle head 38 a known, and therefore not shown, threaded drive may be provided, which may be operated by means of a rotary head 44.

Figure 2:
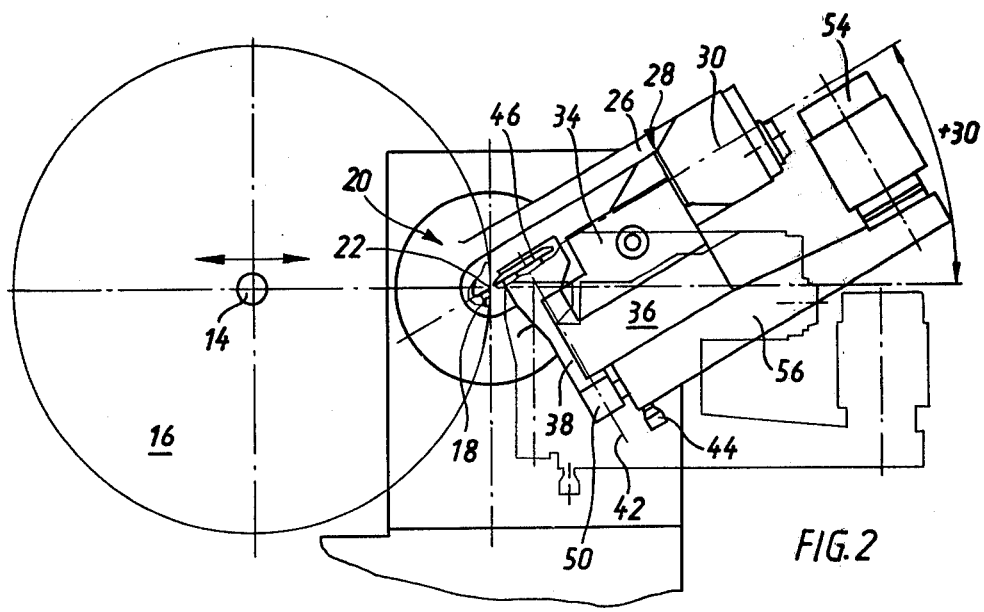
FIG. 2 is a corresponding side view in which the movable parts are indicated in a position for grinding the surfaces of the face of the teeth with a rake angle of +30° shown in solid lines and in a position for grinding the tooth face surfaces with a rake angle of 0° indicated with thin lines.
Figure 3:
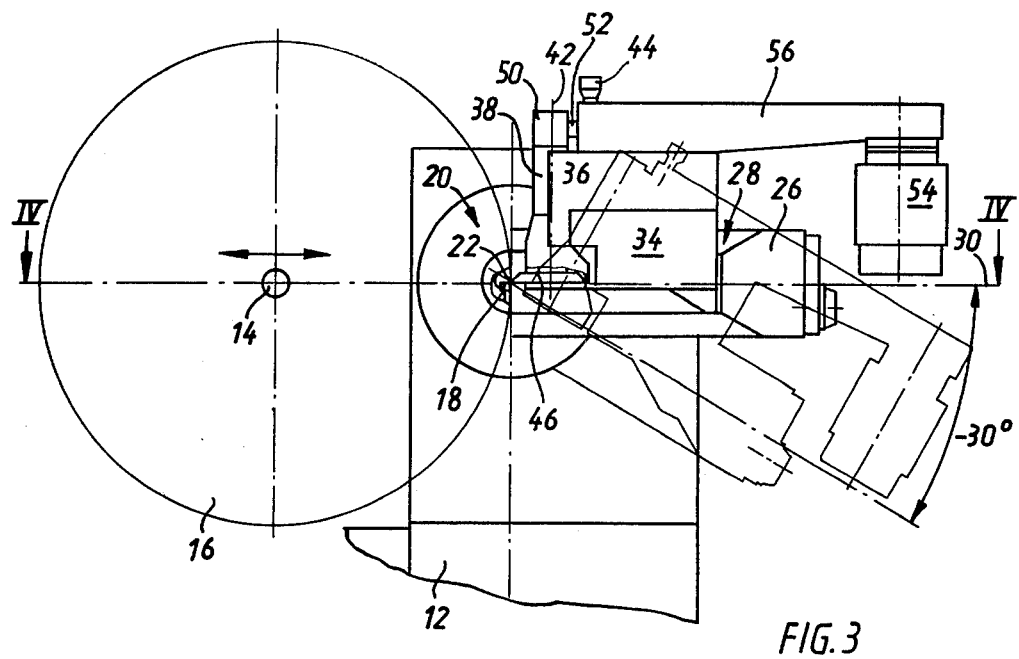
FIG. 3 is a corresponding side view in which the movable parts are indicated in an additional position for grinding the surfaces of the tooth faces with a rake angle of 0° shown in solid lines and in a position for grinding the surfaces of the tooth face with a rake angle of −30° indicated with thin lines.

At the one end of the spindle 40 for the grinding wheel, the grinding wheel 46, which is plate-shaped is attached easily releasably in such a way, that its operating surface 48 faces either away from the spindle 40 of the grinding wheel according to FIGS. 1 and 3, or faces the spindle of the grinding wheel according to FIG. 2. For example, the grinding wheel may be secured by a threaded shaft and nut connection which provides for simplified reversal.

At the other end of the spindle 40 of the grinding wheel, a belt pulley 50 has been attached which is connected via a driving belt 52 with an electric motor 54. The electric motor 54 is carried by a hollow arm 56 attached to the lifting carriage 36, in the hollow space of which the driving belt 52 runs.

Figure 5:
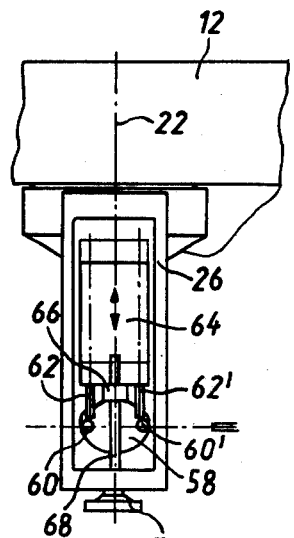
FIG. 5 is a view in the direction of the arrow V in FIG. 4.
Figure 4:
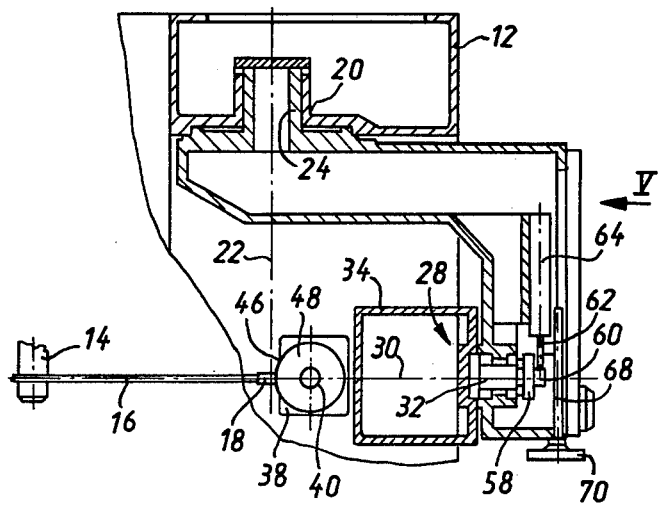
FIG. 4 shows a section taken along line IV—IV in FIG. 3.

A plate 58 is attached to the stump 32 of the shaft. On this plate 58 two rollers 60 and 60' are mounted freely rotatably diametrically opposed to each other relative to swiveling axis 30. One piston rod 62 or 62' is assigned to the rollers 60 and 60', respectively. These piston rods operate in mutually opposite directions in a fluid powered tandem cylinder assembly 64 which, as depicted in FIGS. 4 and 5, is movably disposed inside the carrier 26 for adjustment at right angles relative to the swiveling axis 30. In order to shift the tandem cylinder 64, a nut 66 has been attached to said cylinder which engages a threaded spindle 68 mounted unshiftably on the carrier 26. For the purpose of turning the threaded spindle 68, a rotary head 70 has been attached to its end projecting from the carrier 26.

The tandem cylinder 64 has been shown in FIGS. 4 and 5 with solid lines in a position in which the nut 66 is as closely adjacent as possible to the swiveling axis 30 and the piston rods 62 and 62' project as little as possible from the tandem cylinder. In this position, the tandem cylinder 64 abuts against the pistons of the two piston rods 62 and 62' and has only the effect of preventing the plate 58 from turning in any way, as a result of which the stump 32 of the shaft and with it the carriage guide 34 too, together with the lifting carriage 36 and the spindle head 38 are prevented from turning around the swiveling axis 30. Thus the grinding wheel 46 has been fixed in the last analysis in a position shown for example in FIG. 3, in which the plane of its operating surface 48 extends at right angle to the plane of the saw blade 16. This position has been provided for example, for grinding straight surfaces of tooth faces and straight surfaces of backs of teeth.

However, whenever for example, the saw blade has teeth with surfaces alternatingly slanting to the left and to the right to be ground, the tandem cylinder 64 is shifted by turning of its rotary head 70 from its position shown in solid lines in FIG. 5 in the direction toward the position indicated with thin lines and to be sure the farther, the greater the slant angle is supposed to be. As a result, the tandem cylinder 64 is given the possibility of moving the piston rods 62 and 62' alternatingly in and out, so that through the action of said piston rods on the rollers 60 and 60', the plate 58 and all construction units connected firmly rotatably with it and up to the grinding wheel 46, are swung back and forth in accordance with the feed movements of the saw blade 16.

Whenever the carriage guide 34 with the lifting carriage 36 and the spindle head 38, the spindle 40 of the grinding wheel and the grinding wheel 46 is to be swiveled by 180° for the reasons described initially, so that these construction units will reach the position according to FIG. 3 from the position shown in FIG. 2 or vice versa, then the tandem cylinder 64 is moved so far away from the swiveling axis 30 until the plate 58 may be turned, without the rollers 60 and 60' abutting against the piston rods 62 and 62'. Subsequently, the tandem cylinder 64 is again moved back into a position which corresponds to the desired slant angle of the tooth. In the new position too, the slant angle of the tooth may be adjusted arbitrarily between, for example, 45° and 0°.

It will be realized, then, that the lifting carriage 36 is mounted to the carrier for rotational movement about a swiveling axis 30 which intersects the axis 42 of the spindle. The lifting carriage is rotatable at least 180° from a standard position in which the spindle axis 42 is located in or parallel to the plane of the saw blade 45 (FIGS. 1,2,3). Thus, the lifting carriage can be swung from the thin line position of FIG. 2 to the heavy line position of FIG. 3. The tilting axis 22 of the carrier 26 is oriented perpendicular relative to a plane containing both the spindle axis 42 and the swiveling axis 30. The carrier 26 is rotatable within a range of at least 90° about its tilting axis. This tilting range lies on both sides of a neutral position in which the spindle axis is parallel to the direction of feed (depicted in thin lines in FIG. 2).

Accordingly, the carrier 26 can be swung from, say, the heavy line position of FIG. 2 to the thin line position of FIG. 2. From there, the lifting carriage 34 can be swiveled to the heavy line position of FIG. 3 about the swireling axis 30. Thereafter, the carrier 26 can be swung to the thin line position of FIG. 3 (i.e., to the other side of the neutral position shown in thin lines in FIG. 2).

As noted earlier, depending upon the nature of the operations to be performed, it may be desirable in one instance that the swiveling range of the lifting carriage is more than 90°, i.e., is at least 30° or even 45°, to one side of the standard position referred to above, and 210° or even 225° to the other side.

The tilting range of the carrier 26 can be greater than 90°. For example, it can be at least 90° to one side of the neutral position and 30° to the other side.

It will be realized that such a possibility of adjustment of the machine parts provides an extensively useful and advantageous number of positions for the grinding wheel. This enables grinding of front and rear portions of positive as well as negative blade clamping angles to be accomplished without the need for reversing the blade.

Although the invention has been described in connection with a preferred embodiment thereof, it will be appreciated by those skilled in the art that additions, modifications, substitutions and deletions not specifically described may be made without departing from the spirit and scope of the invention as defined in the appended claims.

What is claimed is:

1. A sharpening machine for sharpening toothed saws comprising:
   a support for a saw blade supporting said blade for adjustment in a direction of feed;
   a carrier mounted for rotation about a tilting axis oriented perpendicular relative to the plane of said saw blade;
   a lifting carriage shiftably guided on said carrier for reciprocal movement toward and away from the blade along a swiveling axis lying in the plane of said saw blade and intersecting said tilting axis;
   a spindle head mounted on said lifting carriage;
   a spindle journalled on said spindle head, the axis of said spindle intersecting said swiveling axis; and
   a grinding wheel mounted to said spindle;
   said carrier being rotatable in a range of at least 90° about said tilting axis, said tilting range lying on both sides of a neutral position in which the spindle axis is disposed in a plane parallel to said direction of feed;
   said spindle head being mounted to said carrier by means of said lifting carriage and is swivable relative to said carrier about said swiveling axis;
   said spindle head further having first and second standard positions each of which standard positions defined by said spindle axis being located in or parallel to the plane of said saw blade, the swiveling range of said spindle head being at least 30° to either side of each of said first and said second standard positions; said spindle head being arranged to be rotated about said swivel axis by 180° from said first standard position to said second standard position and vice versa when said carrier is in said neutral position.

2. A machine as claimed in claim 1 wherein the swiveling range of said spindle head is 45° to either side each of said first and said second standard positions.

3. A machine as claimed in claim 1 wherein the tilting range of said carrier is at least 90° to one side of the neutral position and 30° to the other side.

* * * * *